Nov. 18, 1952　　　　　　　J. RINNE　　　　　　　2,618,034
CLOTHESPIN
Filed Dec. 12, 1950　　　　　　　　　　　　3 Sheets-Sheet 1

INVENTOR.
JOHN RINNE
BY 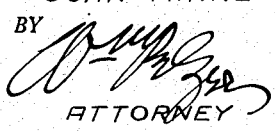
ATTORNEY

Nov. 18, 1952 J. RINNE 2,618,034
CLOTHESPIN
Filed Dec. 12, 1950 3 Sheets-Sheet 2
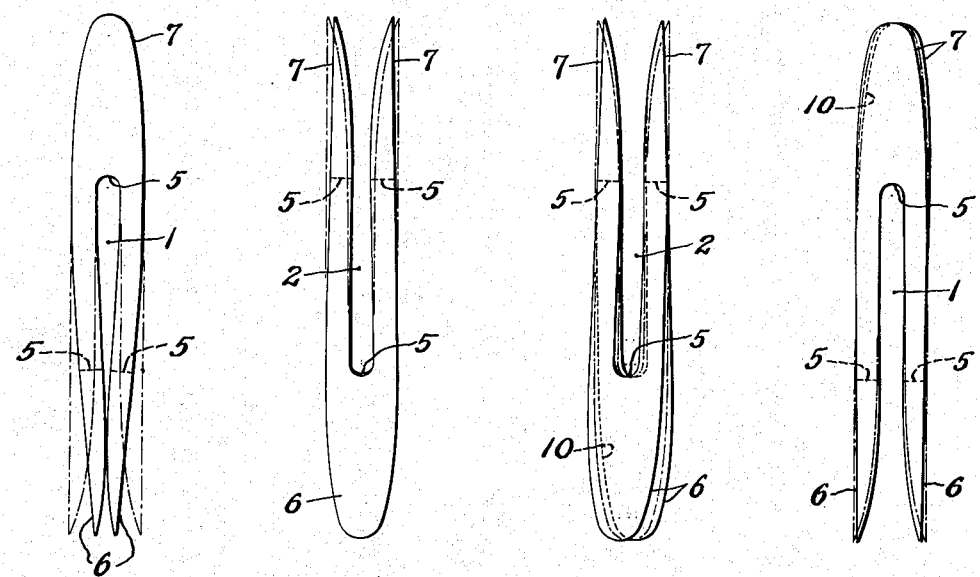
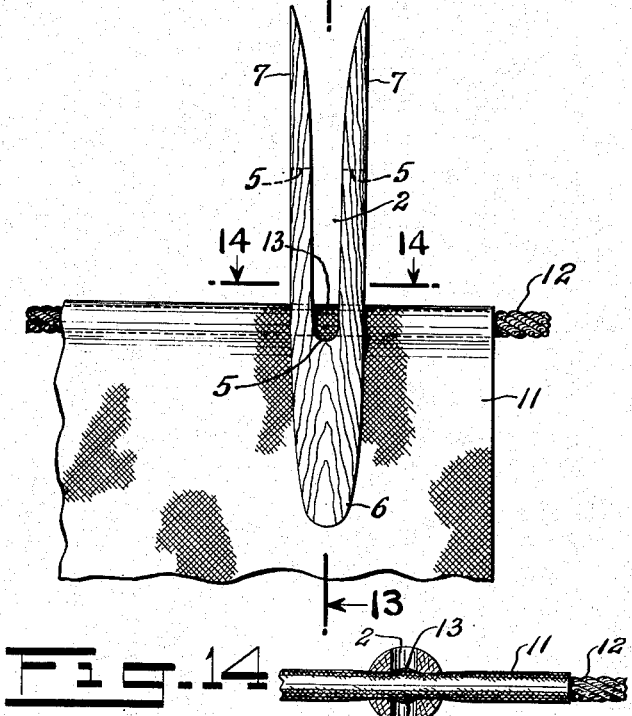
INVENTOR.
JOHN RINNE
BY
ATTORNEY Nov. 18, 1952 — J. RINNE — 2,618,034
CLOTHESPIN
Filed Dec. 12, 1950 — 3 Sheets-Sheet 3
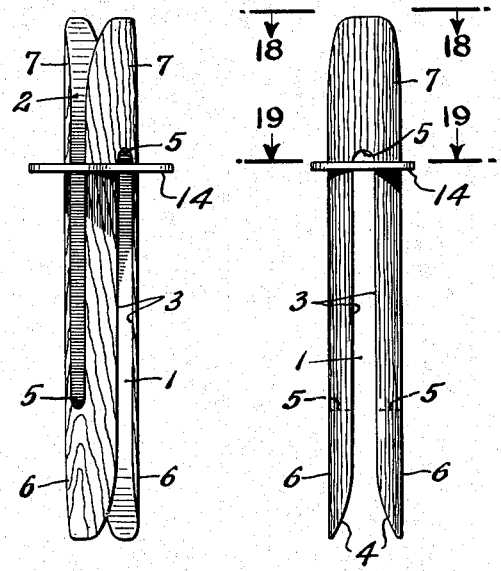
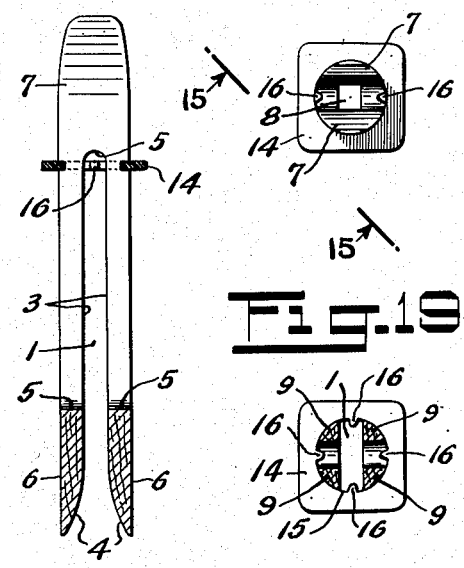
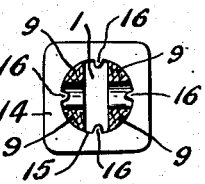
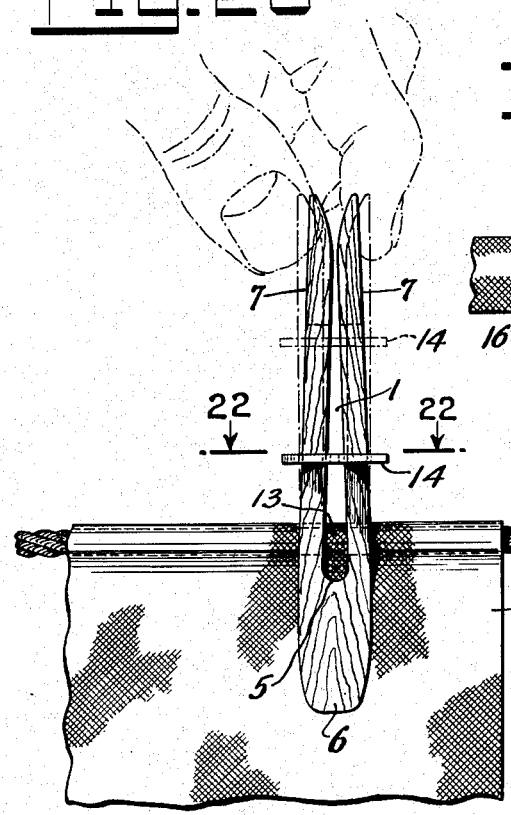
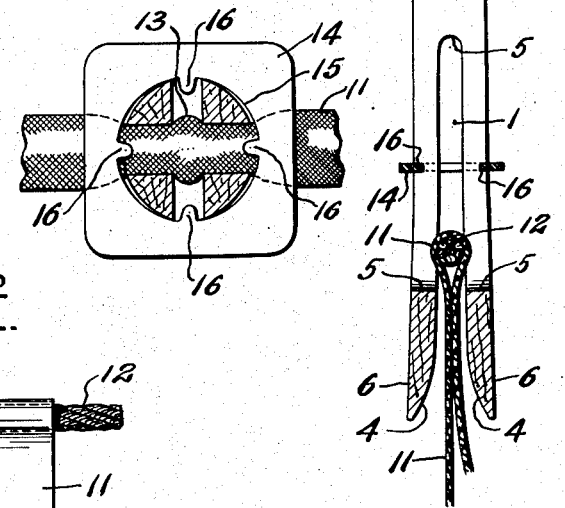
INVENTOR.
JOHN RINNE
BY
ATTORNEY Patented Nov. 18, 1952

2,618,034

UNITED STATES PATENT OFFICE 2,618,034

CLOTHESPIN

John Rinne, Huguenot, N. Y.

Application December 12, 1950, Serial No. 200,441

2 Claims. (Cl. 24—138)

This invention relates to clips for securing articles together and to clamping devices for securing articles upon a rope from which the articles are suspended for airing or drying. The main object of the invention is to provide a clamping device or clothes-pin that will not fracture or split in use and effect a better clamping or gripping of an article upon a clothes-line.

It is well known that in the use of ordinary clothes-pins having the usual pair of clamping prongs, the shank of the pin is frequently split when applying pressure to securely clamp articles upon a clothes-line, or that one prong is broken off at the shank, and that to reduce this contingency such pins have been provided with wire or metal bands at the juncture of the shank and prongs.

I have found that this weakness can be overcome by providing a double-ended clamping device or clothes-pin having a pair of clamping prongs at both ends of the device, instead of the usual shank and one pair of clamping prongs as in the ordinary clothes-pin, and forming the pair of prong slots in planes at an angle to each other, preferably at a right angle, with the depth of the prong slots intersecting at the midsection of the pin. The intersecting and angular relation of the pair of prong slots perform a double function.

First, due to the intersecting depth and angular relation of the prong slots the rigidity normally present at the juncture of the clamping prongs and pin shank of the conventional two-prong or single-ended clothes-pin is removed, and increased resilience is obtained, so that as pressure is applied to the pin when clamping articles together or upon a clothes-line the strain caused by the outward flexing of the clamping prongs is transmitted to the opposite pair of free prongs causing them to take up the stress and flex away from each other, thereby reducing the strain on the clamping prongs and practically obviating the fracturing or splitting strain at the midsection.

Secondly, this stress transmission enhances the clamping function of the prongs without strain at the base of the prongs, and the intersecting feature of the pair of prong slots increases the gripping function due to the material of the article when clamped on a clothes-line being forced into the free slot between the upper pair of prongs on opposite sides of the slot of the clamping prongs at a point near the inner end of the free slot, thereby preventing the tendency of the pin to spring upward or slip laterally on the clothes-line and consequent loosening of its grip on the material of the article being clamped.

A further advantage of this double-ended clothes-pin is that it facilitates handling and adjustment into clamping position in that the user when grasping the pin for application to a clothes-line will invariably insert a finger between the upper pair of prongs, thereby automatically presenting the lower pair of prongs in correct position for clamping application to an article on the clothes-line.

A further advantage of this double-ended clothes-pin is that it permits a wider selection of wood stock from which the pins are made in that splitting or fracture in use being practically eliminated the grain characteristics of the wood stock is not so important, and the pins may be made in any size, and the cost of production is materially reduced.

Another feature of the invention is the ready application of an adjustable or self-positioning locking ring to the clamping prongs of the double-ended clothes-pin. The ring is so formed and applied that when placed upon the pin it becomes non-removable in use, and will automatically set itself in locking position through the act of applying the clothes-pin to an article on the clothes-line.

The improved double-ended clothes-pin and its stress transmission functioning and the locking ring are illustrated in the accompanying drawings, in which—

Figure 6:
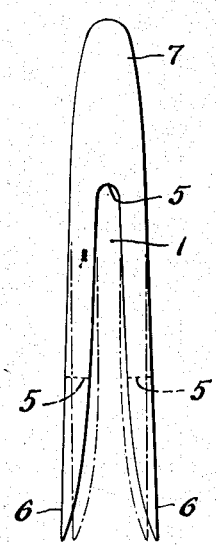
Figure 7:
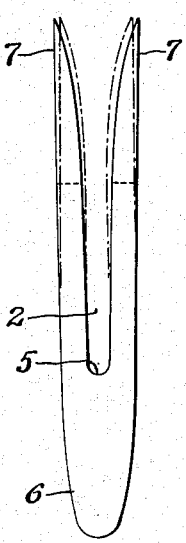

Figures 6 and 7 show the relative flexing of the two pairs of clamping prongs when the pin is forced into clamping position on a clothes-line; the former showing in broken lines the normal position of the lower clamping prongs before being spread outward to the solid line position in the act of effecting the clamping of an article upon a clothes-line, and the latter showing in broken lines the position of the upper or free clamping prongs before the spreading of the lower prongs, and in solid lines the outward flexing of the free prongs due to the transmission of the stress from the clamping prongs.

Figures 8 to 11 are additional views of the clothes-pin showing in solid and broken lines the relative flexing of the two pairs of clamping prongs when pressure is applied to the ends of either pair of prongs.

Figure 12 is an elevation illustrating the clamping of an article to a clothes-line and showing the positions of the article and line relative to the inner end of the upper or free slot of the pin.

Figures 13 and 14 are sectional views on the lines 13—13 and 14—14 of Figure 12 illustrating the bulging of the material of the article into the upper or free prong slot of the pin.

Figures 15, 16 and 17 illustrate the double-ended clothes-pin provided with the adjustable locking ring for the clamping prongs.

Figures 18 and 19 are top and sectional views, respectively, on the lines 18—18 and 19—19 of Figure 16.

Figures 20 and 21 are views similar to Figures 12 and 13 illustrating the functioning of the adjustable locking ring, and Figure 22 is an enlarged cross-sectional view on the line 22—22 of Figure 20.

Referring to the drawings, the body of the clothes-pin is illustrated as made from a single piece of round wood stock and slotted from opposite ends to form prong slots 1 and 2. These slots are of uniform width at approximately the inner half of the depth of the slot as shown at 3 and curve or taper outward as shown at 4 to facilitate application to a clothes-line. The inner ends of the slots are preferably rounded as shown at 5 to form fillets and facilitate gripping of the material on a clothes-line. The depth of the slots 1—2 which are preferably formed in planes at right angles to each other as seen in Figure 1, is such as to intersect for approximately one-half of their depth at the mid-section of the pin, and form two pairs of clamping prongs 6 and 7 projecting in opposite directions in planes at right angles to each other.

Figure 1:
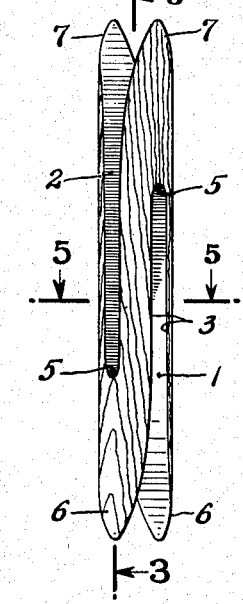
Figure 1 is an elevation of the device showing the clamping prong slots formed at right angles to each other and the intersection and depth of the slots at the midsection of the pin.
Figure 2:
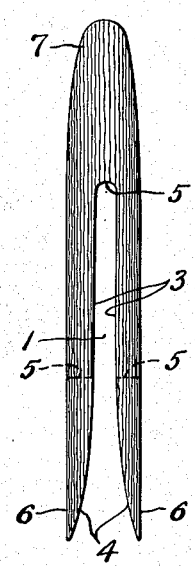
Figure 2 is an elevation of the pin looking directly through one of the prong slots.
Figure 3:
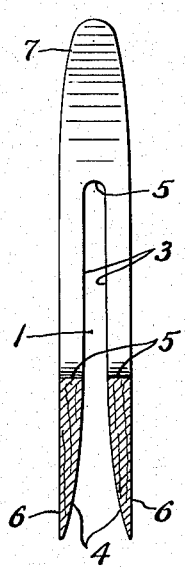
Figure 3 is a vertical section on the line 3—3 of Figure 1.
Figure 4:
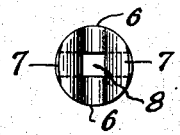
Figure 4 is a top or end view of the pin showing a rectangular cavity formed at the mid-section by the intersection of the prong slots.
Figure 5:
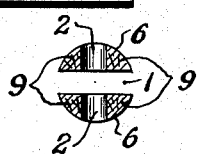
Figure 5 is a cross-section of the pin at the midsection on the line 5—5 of Figure 1 illustrating the right angular and intersecting feature of the prong slots and the four-point stress transmitting mid-section.

This construction results in a rectangular cavity 8 at the mid-section of the pin as seen in Figure 4 and which cavity extends the length of the prong slots 1—2 between the slots ends 5 and provides four quarter-round sections 9—9 between the two pairs of clamping prongs 6—7 at the mid-section of the pin as illustrated in Figure 5 and as seen in Figure 1 each adjacent pair of sections 9—9 extend between three of the clamping prongs of the pin. This four-point connection between the two pairs of clamping prongs provides the resilience which relieves the strain on the prongs and transmits the stress from one pair of prongs to the other pair as illustrated in Figures 6 to 11, and thereby overcomes the liability to fracture or splitting of the pin.

The transmission of the stress from one pair of clamping prongs to the other is illustrated in Figures 6 and 7, where the normal positions of the prongs are shown in broken lines; Figure 6 showing in solid lines the outwardly flexed position of the lower or clamping prongs 6—6 when applied in use to a clothes-line, and the resultant or corresponding outward flexing of the upper or free prongs 7—7 as seen in Figure 7 due to the transmission of stresses from 6—6 through connections 9—9. The action is further illustrated in Figures 8 to 11, where in Figures 8 and 9 the pinching of the prongs 6 from the normal position shown in broken lines in Figure 8 to the solid line position results in the corresponding inward flexing of the prongs 7 from the broken line position to the solid line position of Figure 9. In Figures 10 and 11 the opposite and an additional or torsional effect is illustrated, where the outward flexing of the prongs 6 from the solid line position to the broken line position, as occurs when applying the pin to a clothes-line, effects the outward flexing of the prongs 7 shown by broken lines, and a simultaneous lateral flexing of both pairs of prongs as indicated by the dotted lines 10 in Figures 10 and 11 due to the torsional effect created in pin sections 9—9 by the difference in strain on the individual prongs and consequent difference in stress transmission and thereby avoiding fracture.

In Figures 12 to 14 the bulging of the material 11 into the upper or free prong slot 2 when clamped to a clothes-line 12 is shown at 13—13. From the illustration in Figure 13 it will be observed that when the clothes-pin is in clamping position the bulging of the material 11 into the prong slot on opposite sides of the clothes-line will effect a gripping under the line as seen in Figure 13, thereby preventing the slipping or springing of the pin upward relative to the clothes-line and material, and insure a firm grip, and in Figure 14 it will be observed that the bulging of the material at 13—13 into the prong slot 2 on opposite sides of the prong slot 1 prevents lateral slipping of the pin, and thereby avoiding the loosening of the gripping action due to such slipping.

The double-ended or shankless clothes-pin permits the application of an adjustable and self-positioning locking ring as shown in Figures 15 to 22. This ring may be of any suitable form adapted to slide freely on the prongs 6 and 7. The preferred form is a rectangular disk 14 made of a plastic material and punched from sheet stock with a circular hole 15 of a diameter to permit the disk to slide freely on the clamping prongs, and four short lugs 16 projecting at diametrically opposite points which are adapted to freely enter the prong slots 1 and 2. To apply the locking ring to the clothes-pin the disk of plastic material is heated to cause it to expand and thereby increase the diameter of the hole 15 sufficiently to allow the lugs to slip over the ends of the clamping prongs when one pair of prongs are pinched as in Figure 20, and when the lugs 16 are opposite the prong slots 1 and 2 the release of pressure on the prongs will cause the lugs to enter the slots, whereupon on contraction of the disk in cooling, the hole 15 will decrease to its original diameter and lugs 16 will project entirely within the prong slots thus retaining the locking ring permanently on the pin as seen in Figures 17, 18 and 19.

In use when the clothes-pin is applied to an article 11 on a clothes-line 12, the clamping prongs 6—6 are forced downward into clamping position and the free prongs 7 are pinched toward each other as indicated in Figure 20, whereupon the locking ring will slide freely downward to a point where the spread of the clamping prongs due to the thickness of the article and line 12 will stop the disk, and then increased clamping effect may be obtained by pressing the locking ring firmly upon the clamping prongs. This method of securing increased clamping effect is advantageous since it does not require excessive downward pressure on the pin to obtain the desired clamping, and thereby avoiding possible damage to the material being clamped, and reduces the strain on the clamping prongs. This method of obtaining the desired clamping effect is of particular advantage in clamping sheer fabrics and laces.

It will be noted that this improved double-ended clothes-pin is made from round stock as shown in Figures 4 and 5 not only in the conventional wood form, but may with equal advantage be made of rust-proof metal, plastic or other suitable materials. A pin made of round stock of wood or other materials is preferred over the square or angular stock for the reason that such stock, especially at the mid-sections 9—9 of the pin, does not afford the torsional effect and the same degree of resilience and stress transmission resulting from the use of round stock. It will also be understood that while the device is specifically described and shown as a clothes-pin, the device with various widths of prong slots may be employed for various other purposes.

What I claim is:

1. A double-ended clothes pin made of stock round in cross-section with a pair of clamping prongs at both ends of the pin, prong slots formed in planes at a right angle to each other and intersecting at the mid-section of the pin for a length equal approximately to one-half the depth of the prong slots and forming at the mid-section of the pin a cavity and four quarter-round stress transmitting sections, and each adjacent pair of such stress transmitting sections extending between three clamping prongs of the pin, whereby stresses caused by the contraction or expansion of the pair of prongs at one end of the pin create flexure and torsional effects in the four quarter-round sections, and which effects are transmitted to the opposite pair of prongs and result in like contraction or expansion of said prongs.

2. A clothes-pin as defined in claim 1 in combination with a locking disk having a circular hole of a diameter to slide freely on the clamping prongs and four retaining lugs on the inner periphery of the disk adapted to project from opposite sides into the clamping slots for retaining the disk on the pin and adapted to move automatically downward on the pin upon contraction of the upper pair of clamping prongs.

JOHN RINNE.

REFERENCES CITED

The following references are of record in the file of this patent:

UNITED STATES PATENTS

| Number | Name | Date |
| --- | --- | --- |
| 119,311 | Burling | Sept. 26, 1871 |
| 643,533 | Prime | Feb. 13, 1900 |
| 718,794 | Reimard | Jan. 20, 1903 |
| 955,219 | Spinney | Apr. 19, 1910 |
| 1,395,424 | Justus | Nov. 1, 1921 |
| 1,580,824 | Gothier | Apr. 13, 1926 |

FOREIGN PATENTS

| Number | Country | Date |
| --- | --- | --- |
| 123,444 | Australia | Jan. 29, 1947 |
| 67,407 | Denmark | Aug. 16, 1948 |